(12) United States Patent
Kasher et al.

(10) Patent No.: US 9,893,785 B2
(45) Date of Patent: Feb. 13, 2018

(54) ENHANCED BEAMFORMING TRAINING IN A WIRELESS LOCAL AREA NETWORKS

(71) Applicant: Intel IP Corporation, Santa Clara, CA (US)

(72) Inventors: Assaf Kasher, Haifa (IL); Carlos Cordeiro, Portland, OR (US); Alexander Maltsev, Nizhny Novgorod (RU); Artyom Lomayev, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 1 day.

(21) Appl. No.: 14/969,506

(22) Filed: Dec. 15, 2015

(65) Prior Publication Data
US 2017/0078008 A1    Mar. 16, 2017

Related U.S. Application Data

(60) Provisional application No. 62/217,223, filed on Sep. 11, 2015.

(51) Int. Cl.
*H04L 12/40* (2006.01)
*H04B 7/06* (2006.01)
*H04B 7/0413* (2017.01)
*H04L 29/06* (2006.01)

(52) U.S. Cl.
CPC ......... *H04B 7/0617* (2013.01); *H04B 7/0413* (2013.01); *H04B 7/0639* (2013.01); *H04L 69/22* (2013.01)

(58) Field of Classification Search
CPC .. H04B 7/0617; H04B 7/0639; H04B 7/0413; H04L 69/22
See application file for complete search history.

(56) References Cited

U.S. PATENT DOCUMENTS

| | | | |
|---|---|---|---|
| 8,838,051 B1* | 9/2014 | Su .................... | H04B 7/0465 375/267 |
| 2011/0128929 A1* | 6/2011 | Liu .................... | H04L 25/03343 370/329 |
| 2017/0085306 A1* | 3/2017 | Cariou ................ | H04B 7/0619 |

* cited by examiner

*Primary Examiner* — Phuc Tran
(74) *Attorney, Agent, or Firm* — Schwegman Lundberg & Woessner, P.A.

(57) ABSTRACT

Apparatus, computer readable media, and methods for enhanced beamforming training in a wireless local area network are disclosed. An apparatus of a access point or station is disclosed. The apparatus including processing circuitry where the processing circuitry is configured to encode an EBRP packet comprising a first portion comprising an indication of a first number of transmit antenna training settings (N-TX), and an indication of a second number of receive training subfields per N-TX settings (N-RX), and a second portion comprising a third number of training subfields. The third number may be less than or equal to N-TX times N-RX. The processing circuitry may be configured to cause the first portion of the EBRP packet to be transmitted and cause the second portion to be transmitted, where two or more of the third number of training subfields are to be transmitted simultaneously using different antennas and orthogonal sequences.

25 Claims, 6 Drawing Sheets ical field

ENHANCED BEAMFORMING TRAINING IN A WIRELESS LOCAL AREA NETWORKS

PRIORITY CLAIM

This application claims the benefit of priority under 35 USC 119(e) to U.S. Provisional Patent Application Ser. No. 62/217,223, filed Sep. 11, 2015, which is incorporated herein by reference in their entirety.

TECHNICAL FIELD

Embodiments pertain to wireless communications in a wireless local-area network (WLAN). Some embodiments relate to beamforming training. Some embodiments relate to Institute of Electrical and Electronic Engineers (IEEE) 802.11 and some embodiments relate to IEEE 802.11ay, next generation 60 gigahertz (NG60), IEEE 802.11ad, and millimeter Wave (mmWave). Some embodiments relate to beamforming training for single user (SU) and multiple-user (MU) multiple-input multiple output (MU-MIMO).

BACKGROUND

Users of wireless networks often demand more bandwidth and faster response times. However, the available bandwidth may be limited. Moreover, it may be difficult to communicate with wireless devices operating with different operating characteristics and with a different number of antennas. Additionally, wireless devices may operate with different communication standards.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
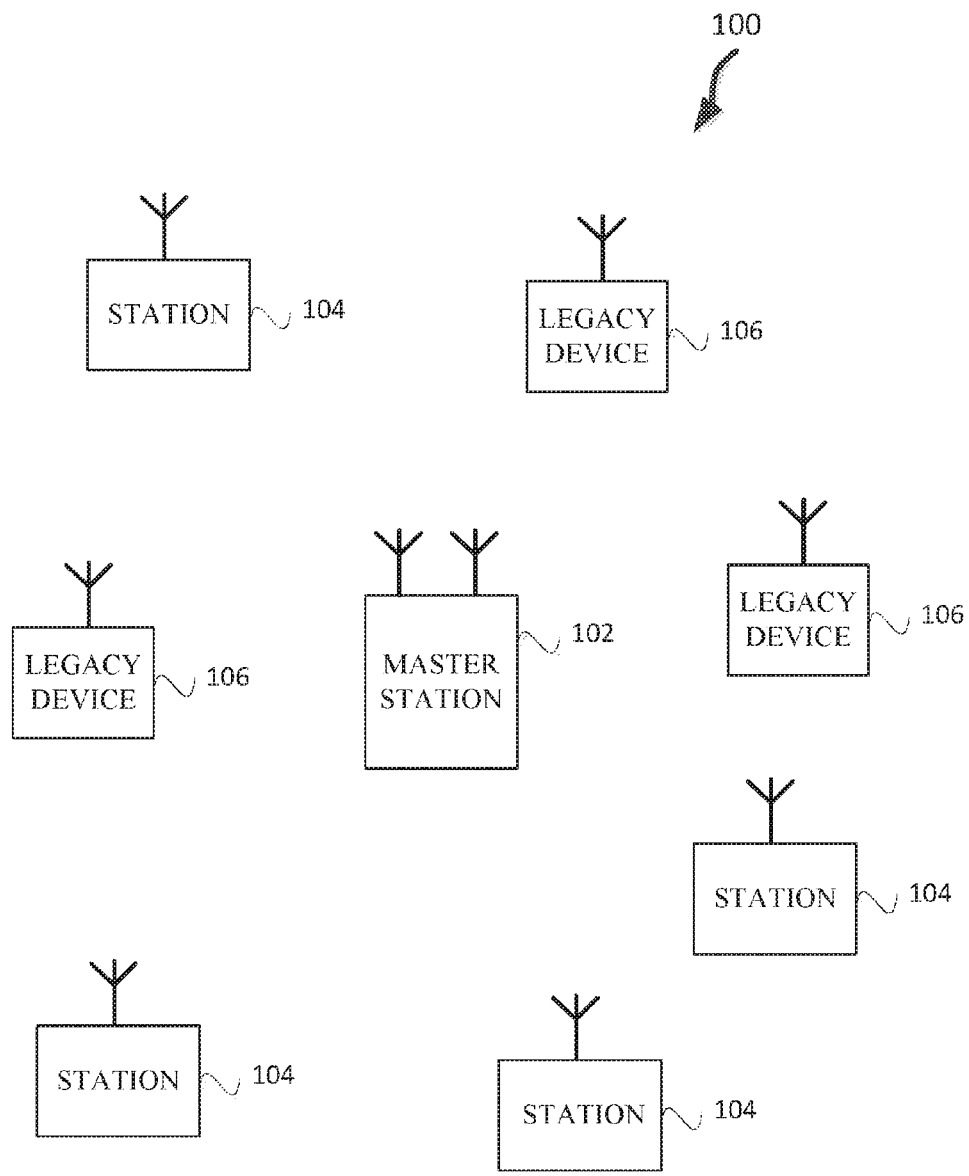
FIG. 1 illustrates a WLAN in accordance with some embodiments.

FIG. 1 illustrates a WLAN 100 in accordance with some embodiments. The WLAN may comprise a basis service set (BSS) or personal BSS (PBSS) 100 that may include a master station 102, which may be an AP or PBSS control point (PCP), a plurality of wireless (e.g., IEEE 802.11ay) STAs 104 and a plurality of legacy (e.g., IEEE 802.11n/ac/ad) devices 106.

The master station 102 may be an AP using the IEEE 802.11 to transmit and receive. The master station 102 may be a base station. The master station 102 may be a PBSS. The master station 102 may use other communications protocols as well as the IEEE 802.11 protocol. The IEEE 802.11 protocol may be IEEE 802.11ay. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA), multiple-input multiple-output (MIMO), multi-user MIMO (MU-MIMO), and/or single-input single-output (SISO). The master station 102 and/or wireless STA 104 may be configured to operate in accordance with NG60, WiGiG, and/or IEEE 802.11ay.

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The wireless STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ay or another wireless protocol. In some embodiments, the wireless STAs 104 may operate in accordance with IEEE 802.11 ax. The STAs 104 and/or master station 102 may be attached to a BSS and may also operation IEEE 802.11ay where one of the STAs 104 and/or master station 102 takes the role of the PCP.

The master station 102 may communicate with legacy devices 106 in accordance with legacy IEEE 802.11 communication techniques. In example embodiments, the master station 102 may also be configured to communicate with wireless STAs 104 in accordance with legacy IEEE 802.11 communication techniques. The master station 102 may use techniques of 802.11ad for communication with legacy device. The master station 102 may be a personal basic service set (PBSS) Control Point (PCP) which can be equipped with large aperture antenna array or Modular Antenna Array (MAA).

The master station 102 may be equipped with more than one antenna. Each of the antennas of master station 102 may be a phased array antenna with many elements. In some embodiments, an IEEE 802.11ay frame may be configurable to have the same bandwidth as a channel. The frame may be configured to operate over 1-4 2160 MHz channels. The channels may be contiguous.

An 802.11ay frame may be configured for transmitting a number of spatial streams, which may be in accordance with MU-MIMO. In other embodiments, the master station 102, wireless STA 104, and/or legacy device 106 may also implement different technologies such as code division multiple access (CDMA) 2000, CDMA 2000 IX, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to 802.11ay communications. In accordance with some IEEE 802.11ay embodiments, a master station 102 may operate as a master station which may be arranged to contend for a wireless medium (e.g., during a contention period) to receive exclusive control of the medium for performing enhanced beamforming training for a multiple access technique such as OFDMA or MU-MIMO. In some embodiments, the multiple-access technique used during the TxOP (transmit opportunity) may be a scheduled OFDMA technique, although this is not a requirement. In some embodiments, the multiple access technique may be a space-division multiple access (SDMA) technique.

The master station 102 may also communicate with legacy stations 106 and/or wireless stations 104 in accordance with legacy IEEE 802.11 communication techniques.

In example embodiments, the station 104, which may be a 802.11ay device, and/or the master station 102 are configured to perform the methods and functions herein described in conjunction with FIGS. 1-6.

Figure 2:
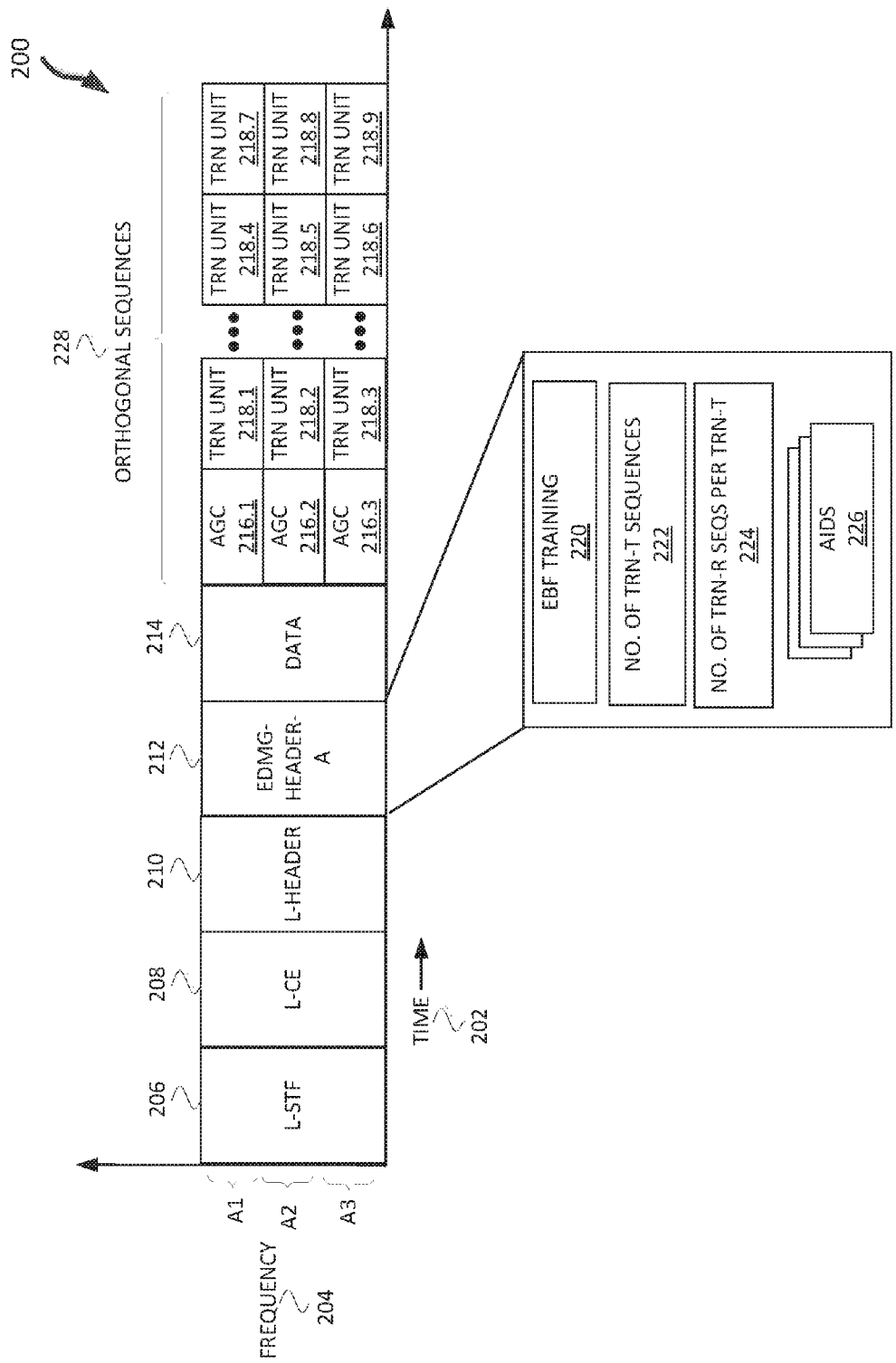
FIG. 2 illustrates an enhanced beam refining protocol (BRP) packet format supporting single input single output (SISO), MIMO, MU-MIMO and MU-SISO in accordance with some embodiments.

FIG. 2 illustrates an enhanced beam refinement protocol (EBRP) packet 200 in accordance with some embodiments. Illustrated in FIG. 2 is frequency 204 along a vertical axis, time 202 along a horizontal axis, legacy short training field (L-STF) 206, legacy channel estimation (L-CE) 208, legacy header (L-Header) 210, enhanced directional multi-gigabit (EDMG) Header-A 212, data 214, and orthogonal sequences 228, which may include automatic gain control (AGC) 216, and training units (TRN Units) 218. The L-STF 206 may be composed of repetitions of Golay sequences. The L-CE 208 may be a concatenation of two sequences. The L-CE 208 may be used for channel estimation and an indication of which modulation is going to be used for the EBRP packet 200. The L-CE 208 and/or L-Header 210 may indicate either a single carrier modulation or an OFDM modulation. The L-STF 206 and L-CE 208 may help the receiver in signal acquisition, automatic gain control training, predicting the characteristics of the channel for the decoder, and frequency offset estimation and synchronization.

The L-Header 210 may indicate the length of the EBRP packet 200 as well as a modulation and coding scheme (MCS) that is compatible with legacy 802.11 devices. The L-Header 210 may indicate a length that includes the orthogonal sequences 228. The EDMG-header-A 206 may include an indication of the modulation and coding scheme, an indication of enhanced beamforming (EBF) training 220, a number of transmitter training (TRN-T) sequences 222, a number of receiver training (TRN-R) sequences (TRN-R) 224, the number of receiver training sequences per TRN-T sequences, and one or more association identifications (AIDS) 226. The EBF training 220 may indicate that this is an enhanced BF training.

The number of TRN-T sequences 222 may be a number of TRN-T sequences 222 in the orthogonal sequences 228. The number of TRN-R sequences per TRN-T sequences 222 may be a number of TRN-R sequences per TRN-T sequences in the orthogonal sequences 228. The AIDS 226 may indicate which stations 104 the EBRP packet 200 is for. The AIDS 226 may indicate an order for the stations 104 to respond to the EBRP packet 200. The AIDS 226 may indicate the stations 104 for which the AG order for the stations 104 to respond to the EBRP packet 200. The AIDS 226 may indicate which stations 104 are to be trained with the AGC 216 and TRN Units 218. Stations 104 may be configured to stop reception of the EBRP packet 200 if they determine their AID is not one of the AIDS 226.

The frame 200 may be transmitted using several antennas. The L-STF, L-CE, L-Header, EDMG-A header are all transmitted from all the antennas with a small delay of a few nano-seconds between the transmission of different antennas. The orthogonal sequences 228 are transmitted using a different set of sequences from each antenna, e.g., A1, A2, and A3. There may be fewer or more antennas. The number of sequences may be based on the number of different antenna (or antenna combinations) used to transmit the orthogonal sequences 228. For example, as illustrated there are three orthogonal sequences for the three antennas A1, A2, and A3. This enables concurrent training of all the transmit antennas A1, A2, and A3.

The data 214 may be a MAC payload that includes data. The data 213 may include the antenna weight vector setting (which may be 3 bits per antenna element) per each of the TRN-T sequences 222 for training antenna weight vector settings. The orthogonal sequences 228 may be sequences of AGC 216 and TRN units 218 transmitted orthogonally on one or more antennas A1, A2, and A3. The AGC 216 may be optional and may be automatic gain control fields. TRN Units 218 are training fields that may be TRN-R or TRN-T training fields.

The master station 102 may change the antenna weight vector on each of its antennas at the beginning of each TRN-T field. The total number of TRN units 218 may be up to the number of TRN-T sequences 222 times number of TRN-R sequences per TRN-T 224. The TRN Units 218 transmitted from each of the initiator transmit antennas are using orthogonal sequences. This allows the simultaneous transmission of TRN Units 218, which enables simultaneous transmission to multiple receiving stations 104.

The EBRP packet 200 not including the orthogonal sequences 228 may be transmitted with the following antenna vector settings: (1) if only one station 104 is being trained, the antenna weight vector that is the best transmitted sector to that station 104 is used in all antennas. A delay of 2 nanoseconds is used between the transmissions from different antenna. (2) If multiple stations 104 are being trained, then the EBRP packet 200 part not including the orthogonal sequences 228 is transmitted with each antenna using the antenna weight vector setting of the best transmit sector to that antenna. A delay of approximately 2 nanoseconds is used between the transmissions from the different antennas. The EBRP packet 200 may support single input single output (SISO), MIMO, MU-MIMO, and MU-SISO.

The EBRP packet 200 enables training several transmit streams and several receiver streams at the same time. The EBRP packet 200 can be used to train one or more stations 104. The EBRP packet 200 may be a control PHY packet. The EBRP packet 200 may be a single carrier (SC) PHY packet.

Figure 3:
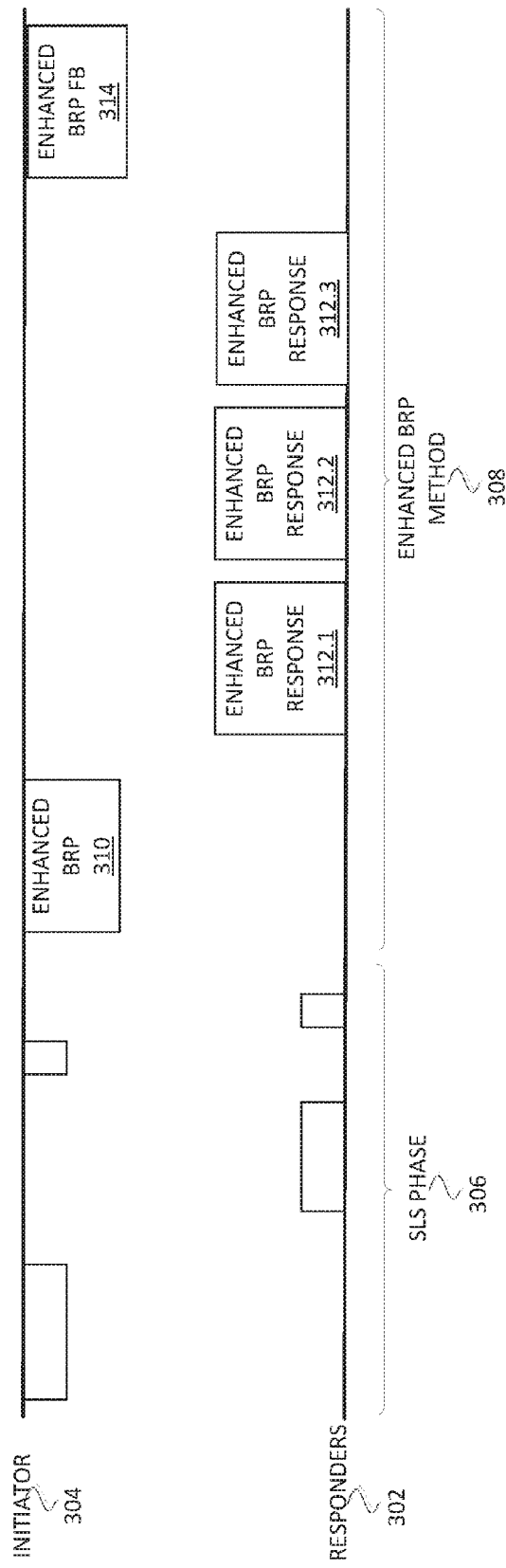
FIG. 3 illustrates a BRP protocol with scheduled feedback in accordance with some embodiments.

FIG. 3 illustrates a sector level sweep phase 306 and a method of enhanced beam refining (BRP) 308 in accordance with some embodiments. Illustrated in FIG. 3 are a sector level sweep (SLS) phase 306 and an enhanced BRP method 308. The enhanced BRP method 308 begins with an initiator 304 transmitting an enhanced BRP 310. For example, the EBRP packet 200 of FIG. 2. The EBRP packet 200 may have three AIDS 226 of three stations 104. The enhanced BRP method 308 continues with the responders transmitting enhanced BRP response 312.1, 312.2, and 312.3, in order. The order of the enhanced BRP responses 312.1, 312.2, and 312.3 may be determined by the order of the AIDS 226. The enhanced BRP responses 312 may include feedback either of the best transmit sector per each of the initiator antennas or the best antenna weight vector setting of each of the initiator transmit antennas. The enhanced BRP responses 312 may be similar to the enhanced BRP 310 with the TRN-T training fields and the TRN-R training fields switched. The method 300 continues with the initiator 304 transmitting an enhanced BRP feedback (FB) 314 packet that includes feedback from the initiator 304 to all the responder stations 104. The method 400 may end.

Figure 4:
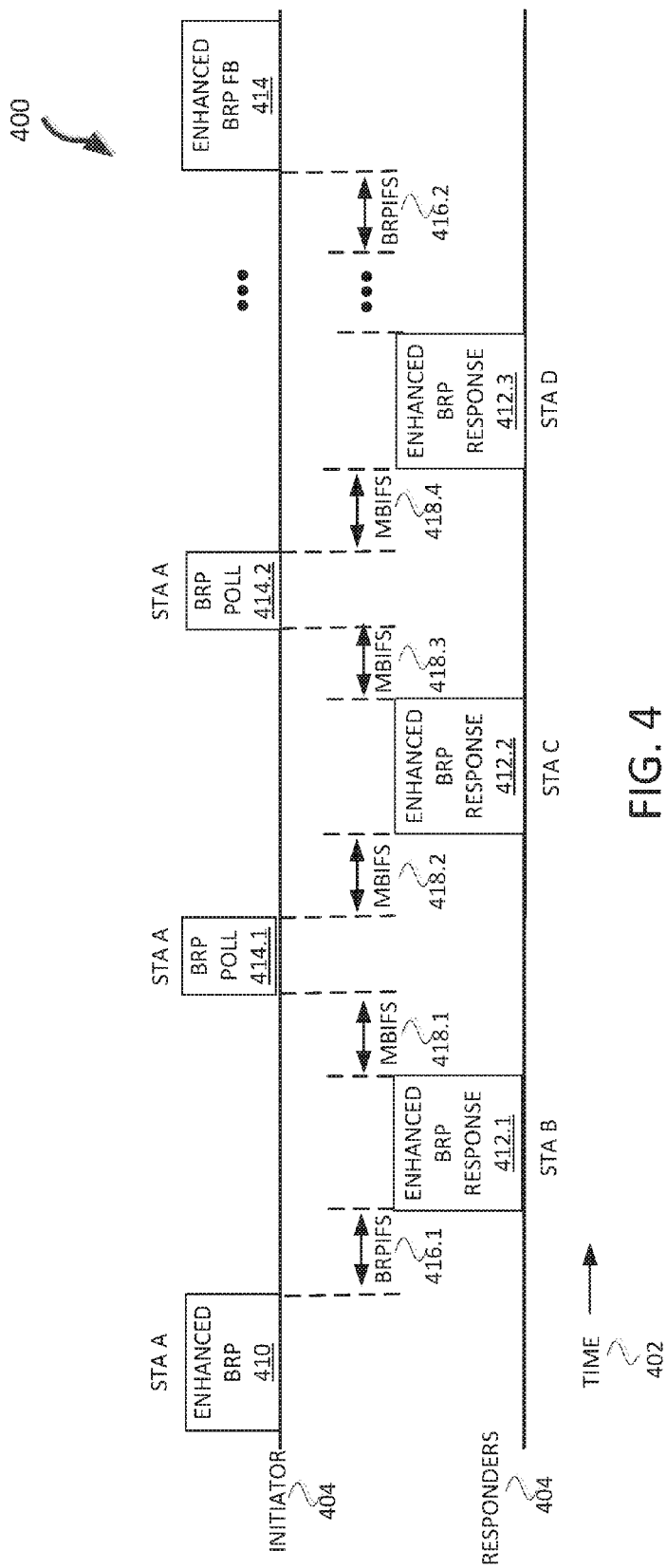
FIG. 4 illustrates a BRP method with polling feedback in accordance with some embodiments.

FIG. 4 illustrates a method of enhanced beam refining (BRP) 400 in accordance with some embodiments. The enhanced BRP method 400 begins with an initiator 404, STA A, transmitting an enhanced BRP 410. For example, the EBRP packet 200 of FIG. 2. The method 400 continues with waiting a BRP inter frame space (BRPIFS) 416.1. The method 400 continues with one of the responders 404, STA B, transmitting an enhanced BRP response 412.1. The AIDS 226, e.g., the AIDS 226 of FIG. 2, may include the AID of STA B, STA C, and STA D. STA B may transmit the enhanced BRP response 412.1 because it was listed first in the AIDS 226. In some embodiments, the initiator 404, STA A, will transmit a poll frame to STA B to prompt STA B to transmit the enhanced BRP response 412.1. The method 400 continues with waiting MBIFS 418.1. The method 400 continues with the initiator 404, STA A, transmitting a BRP poll 414.1. The BRP poll 414.1 may include an AID of STA C. The method 400 continues with waiting 418.2. The method 400 continues with one of the responders 404, STA C, transmitting an enhanced BRP response 412.2. The enhanced BRP responses 412.1, 412.2, 412.3 may include feedback either of the best transmit sector per each of the initiator antennas or the best antenna weight vector setting of each of the initiator transmit antennas. The enhanced BRP responses 412 may be similar to the enhanced BRP 410 with the TRN-T training fields and the TRN-R training fields switched.

The method 400 continues with waiting MBIFS 418.3. The method 400 continues with the initiator 404, STA A, transmitting a BRP poll 414.2 that may include an AID of STA D. The method 400 continues with waiting MBIFS 418.4. The method 400 continues with STA D transmitting enhanced BRP response 412.3. The method 400 may continue for additional responders 402 with the initiator 402 transmitting a BRP poll 414 and the responder 404 responding with an enhanced BRP response 412.

The method 400 continues with waiting BRPIFS 416.2. The method 400 continues with the initiator 404 transmitting an enhanced BRP feedback (FB) 414 packet that includes feedback from the initiator 404 to all the responders 402. The method 400 may end.

Figure 5:
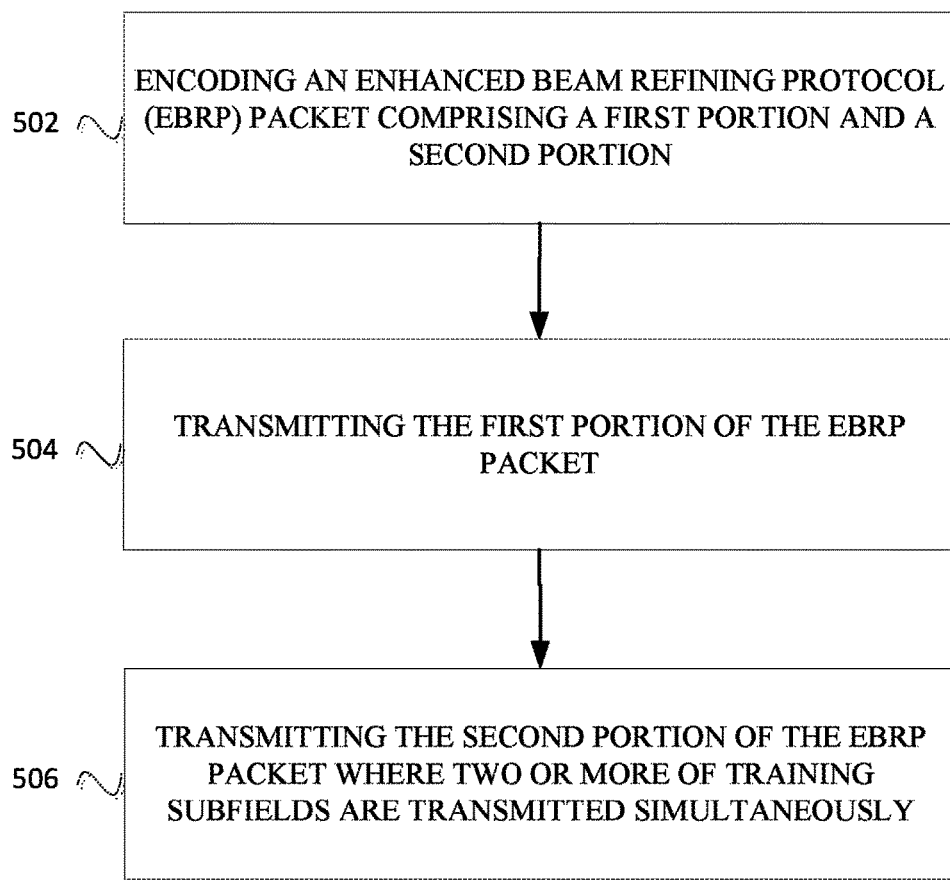
FIG. 5 illustrates a method of transmitting an EBRP packet in accordance with some embodiments.

FIG. 5 illustrates a method of transmitting an EBRP packet in accordance with some embodiments. The method 500 begins at operation 502 with encoding an enhanced beam refining protocol (EBRP) packet comprising a first portion and a second portion. In some embodiments the first portion may comprise an indication of a first number of transmit antenna training settings (N-TX), and an indication of a second number of receive training subfields per N-TX settings (N-RX). In some embodiments the second portion may comprise a third number of training subfields, where the third number is less than or equal to N-TX times N-RX. For example, an initiator 304 may encode packet 200.

The method 500 continues at operation 504 with transmitting the first portion of the EBRP packet. For example, the initiator 304 may transmit a first portion of EBRP 200 which may include one or more of L-STF 206, L-CE 208, L-Header 210, EDMG header-A 212, and data 214.

The method 500 continues at operation 506 with transmitting the second portion of the EBRP packet where two or more training subfields are transmitted simultaneously. In some embodiments, the second portion of the EBRP packet includes a third number of training subfields to be transmitted, where two or more of the third number of training subfields are to be transmitted simultaneously using different antennas of a plurality of antennas and orthogonal sequences. For example, the initiator 304 may transmit orthogonal sequences 228 as described in conjunction with FIGS. 2 and 3. The method 500 may end.

Figure 6:
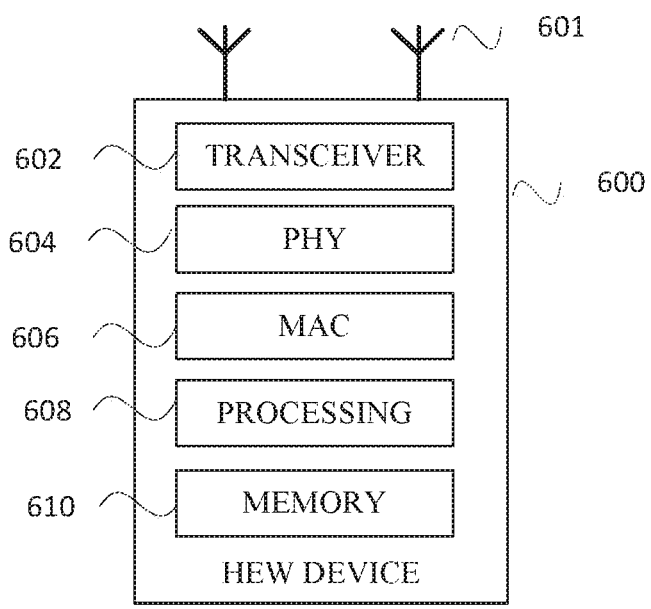
FIG. 6 illustrates a wireless device in accordance with some embodiments.

FIG. 6 illustrates a wireless device in accordance with some embodiments. Wireless device 600 may be an IEEE 802.11ay compliant device that may be arranged to communicate with one or more other IEEE 802.11ay devices, such as STAs 104 (FIG. 1) or master station 102 (FIG. 1) as well as communicate with legacy devices 106 (FIG. 1). STAs 104 and legacy devices 106 may also be referred to as 802.11ay devices and legacy STAs, respectively. Wireless device 600 may be suitable for operating as master station 102 (FIG. 1) or a STA 104 (FIG. 1). In accordance with embodiments, wireless device 600 may include, among other things, a transmit/receive element 601 (for example an antenna), a transceiver 602, physical (PHY) circuitry 604, and media access control (MAC) circuitry 606. PHY circuitry 604 and MAC circuitry 606 may be an IEEE 802.11ay compliant layers and may also be compliant with one or more legacy IEEE 802.11 standards. MAC circuitry 606 may be arranged to configure packets such as a physical layer convergence procedure (PLCP) protocol data unit (PPDUs) and arranged to transmit and receive PPDUs, among other things. Wireless device 600 may also include circuitry 608 and memory 610 configured to perform the various operations described herein. The circuitry 608 may be coupled to the transceiver 602, which may be coupled to the transmit/receive element 601. While FIG. 6 depicts the circuitry 608 and the transceiver 602 as separate components, the circuitry 608 and the transceiver 602 may be integrated together in an electronic package or chip.

In some embodiments, the MAC circuitry 606 may be arranged to contend for a wireless medium during a beam forming training period. In some embodiments, the MAC circuitry 606 may be arranged to contend for the wireless medium based on channel contention settings, a transmitting power level, and a CCA level.

The PHY circuitry 604 may be arranged to transmit the 802.11ay PPDU. The PHY circuitry 604 may include circuitry for modulation/demodulation, upconversion/downconversion, filtering, amplification, etc. In some embodiments, the circuitry 608 may include one or more processors. The circuitry 608 may be configured to perform functions based on instructions being stored in a RAM or ROM, or based on special purpose circuitry. The circuitry 608 may be termed processing circuitry in accordance with some embodiments. The circuitry 608 may include a processor such as a general purpose processor or special purpose processor. The circuitry 608 may implement one or more functions associated with transmit/receive elements 601, the transceiver 602, the PHY circuitry 604, the MAC circuitry 606, and/or the memory 610.

In some embodiments, the circuitry 608 may be configured to perform one or more of the functions and/or methods described herein and/or in conjunction with FIGS. 1-6 such as identifying spatial reuse opportunities, signaling spatial reuse opportunities, and spatially reusing one or more channels.

In some embodiments, the transmit/receive elements 601 may be two or more antennas that may be coupled to the PHY circuitry 604 and arranged for sending and receiving signals including transmission of the 802.11ay packets. The transceiver 602 may transmit and receive data such as 802.11ay PPDU and packets that include an indication that the wireless device 600 should adapt the channel contention settings according to settings included in the packet. The memory 610 may store information for configuring the other circuitry to perform operations for configuring and transmitting 802.11ay packets and performing the various operations to perform one or more of the functions and/or methods described herein and/or in conjunction with FIGS. 1-6 such as identifying spatial reuse opportunities, signaling spatial reuse opportunities, and spatially reusing one or more channels.

In some embodiments, the wireless device 600 may be configured to communicate using OFDM communication signals over a multicarrier communication channel. In some embodiments, wireless device 600 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the wireless device 600 may use 4× symbol duration of 802.11 In or 802.11 ac.

In some embodiments, an wireless device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 601 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the wireless device 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 600 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of an access point or station. The apparatus comprising memory and processing circuitry coupled to the memory. The processing circuitry configured to: encode an enhanced beam refining protocol (EBRP) packet comprising a first portion comprising an indication of a first number of transmit antenna training settings (N-TX), and an indication of a second number of receive training subfields per N-TX settings (N-RX), and a second portion comprising a third number of training subfields, wherein the third number is less than or equal to N-TX times N-RX; cause the first portion of the EBRP packet to be transmitted; and cause the second portion comprising the third number of training subfields to be transmitted, wherein two or more of the third number of training subfields are to be transmitted simultaneously using different antennas of a plurality of antennas and orthogonal sequences.

In Example 2, the subject matter of Example 1 can optionally include where the EBRP packet further comprises a legacy header which indicates a packet length of the first portion and the second portion, and wherein the second portion further comprises automatic gain control (AGC).

In Example 3, the subject matter of Examples 1 or 2 can optionally include where the processing circuitry is further configured to: encode the EBRP packet with one or more association identifiers (AIDS), wherein the AIDS indicate stations that are to respond to the EBRP packet.

In Example 4, the subject matter of Example 3 can optionally include where the processing circuitry is further configured to: receive feedback from a one or more stations corresponding to the one or more AIDs in a sequential order in accordance with an order of the AIDs.

In Example 5, the subject matter of Example 4 can optionally include where the processing circuitry is further configured to: encode a final EBRP feedback packet based on the feedback from the one or more stations; and cause the final EBRP feedback packet to be transmitted to the one or more stations.

In Example 6, the subject matter of Example 3 can optionally include where the processing circuitry is further configured to: encode a poll packet to each station of a plurality of stations corresponding to the one or more AIDs; cause to be transmitted the poll packet; and receive a feedback from the station in response to the poll packet.

In Example 7, the subject matter of any of Examples 1-6 can optionally include where if only one station is to be trained an antenna weight vector that corresponds to a best transmitted sector for the one station is to be used for each antenna of the plurality of antennas to transmit the first portion of the EBRP packet.

In Example 8, the subject matter of any of Examples 1-7 can optionally include where if multiple stations are to be trained, each antenna of the plurality of antennas is to use a best transmit sector for the antenna to transmit the first portion of the EBRP packet.

In Example 9, the subject matter of any of Examples 1-8 can optionally include where the processing circuitry is further configure to: encode in the first portion a media access control data portion, wherein the data portion comprises a 3 bit weight vector for each of the first number of transmit antenna training settings for each antenna of the plurality of antennas.

In Example 10, the subject matter of any of Examples 1-9 can optionally include where the access point or station is one from the following group: an Institute of Electrical and Electronic Engineering (IEEE) 802.11ay access point, an IEEE 802.11ay station, IEEE 802.11ay a personal basic service set (PBSS) control point (PCP), an access point, a station, and a PCP.

In Example 11, the subject matter of any of Examples 1-10 can optionally include where the processing circuitry is configured to transmit and receive in accordance with multiple input multiple output (MIMO), multiple-user MIMO (MU-MIMO) single input single output (SISO), and/or multiple users single input single output (MU-SISO).

In Example 12, the subject matter of any of Examples 1-11 can optionally include a plurality of antennas coupled to the processing circuitry.

Example 13 is a non-transitory computer-readable storage medium that stores instructions for execution by one or more processors to perform operations for device-to-device spatial reuse on an access point or station. The operations to configure the access point or station to: encode an enhanced beam refining protocol (EBRP) packet comprising a first portion comprising an indication of a first number of transmit antenna training settings (N-TX), and an indication of a second number of receive training subfields per N-TX settings (N-RX), and a second portion comprising a third number of training subfields, wherein the third number is less than or equal to N-TX times N-RX; cause the first portion of the EBRP packet to be transmitted; and cause the second portion comprising the third number of training subfields to be transmitted, wherein two or more of the third number of training subfields are to be transmitted simultaneously using different antennas of a plurality of antennas and orthogonal sequences.

In Example 14, the subject matter of Example 13 can optionally include where the instructions further configure the access point or station to: encode the BRP packet with one or more association identifiers (AIDS), wherein the AIDS indicate stations that are to respond to the EBRP packet.

In Example 15, the subject matter of Examples 13 or 14 can optionally include where the instructions further configure the access point or station to: receive feedback from a one or more stations corresponding to the one or more AIDs in a sequential order in accordance with an order of the AIDs.

In Example 16, the subject matter of Examples 15 can optionally include where the instructions further configure the access point or station to: encode a final EBRP feedback packet based on the feedback from the one or more stations; and cause the final EBRP feedback packet to be transmitted to the one or more stations.

In Example 17, the subject matter of Examples 15 can optionally include where the instructions further configure the access point or station to: encode a poll packet to each station of a plurality of stations corresponding to the one or more AIDs; cause to be transmitted the poll packet; and receive a feedback from the station in response to the poll packet.

Example 18 is a method performed by an access point or station. The method comprising: encoding an enhanced beam refining protocol (EBRP) packet comprising a first portion comprising an indication of a first number of transmit antenna training settings (N-TX), and an indication of a second number of receive training subfields per N-TX settings (N-RX), and a second portion comprising a third number of training subfields, wherein the third number is less than or equal to N-TX times N-RX; transmitting the first portion of the EBRP packet; and transmitting the second portion comprising the third number of training subfields to be transmitted, wherein two or more of the third number of training subfields are to be transmitted simultaneously using different antennas of a plurality of antennas and orthogonal sequences.

In Example 19, the subject matter of Example 18 can optionally include encoding the BRP packet with one or more association identifiers (AIDS), wherein the AIDS indicate stations that are to respond to the EBRP packet.

Example 20 is an apparatus of an access point or station, the apparatus comprising memory and processing circuitry coupled to the memory. The processing circuitry configured to: decode a first portion of an enhanced beam refining protocol (EBRP) packet comprising an indication of a first number of transmit antenna training settings (N-TX), and an indication of a second number of receive training subfields per N-TX settings (N-RX); decode a second portion comprising a third number of training subfields, wherein the third number is less than or equal to N-TX times N-RX, wherein two or more of the third number of training subfields are to be received simultaneously using different antenna of a plurality of antennas and orthogonal sequences; and analyze the decoded second portion and encode feedback training subfields.

In Example 21, the subject matter of Example 20 can optionally include where the processing circuitry is further configured to: determine if the EBRP packet comprises an association identifier (AID) of the access point or station and if the EBRP packet does not comprise an AID of the access point or station then disregard the EBRP packet.

In Example 22, the subject matter of Examples 21 can optionally include where the processing circuitry is further configured to: encode feedback to the EBRP packet and cause the feedback to be transmitted to an initiator wireless device in a sequential order in accordance with an order of the AID in a list of AIDs.

In Example 23, the subject matter of any of Examples 20-22 can optionally include where the access point or station is one from the following group: an Institute of Electrical and Electronic Engineering (IEEE) 802.11ay access point, an IEEE 802.11ay station, IEEE 802.11ay a personal basic service set (PBSS) control point (PCP), an access point, a station, and a personal basic service set (PBSS) control point PCP.

In Example 24, the subject matter of any of Examples 20-23 can optionally include where the processing circuitry is configured to transmit and receive in accordance with multiple input multiple output (MIMO), multiple-user MIMO (MU-MIMO) single input single output (SISO), and/or multiple users single input single output (MU-SISO).

In Example 25, the subject matter of any of Examples 20-24 can optionally include a plurality of antennas coupled to the processing circuitry.

Example 26 is an apparatus of an access point or station. The apparatus comprising: means for encoding an enhanced beam refining protocol (EBRP) packet comprising a first portion comprising an indication of a first number of transmit antenna training settings (N-TX), and an indication of a second number of receive training subfields per N-TX settings (N-RX), and a second portion comprising a third number of training subfields, wherein the third number is less than or equal to N-TX times N-RX; means for causing the first portion of the EBRP packet to be transmitted; and means for causing the second portion comprising the third number of training subfields to be transmitted, wherein two or more of the third number of training subfields are to be transmitted simultaneously using different antennas of a plurality of antennas and orthogonal sequences.

In Example 27, the subject matter of Example 26 can optionally include where the EBRP packet further comprises a legacy header which indicates a packet length of the first portion and the second portion, and wherein the second portion further comprises automatic gain control (AGC).

In Example 28, the subject matter of Examples 26 or 27 can optionally include means for encoding the EBRP packet with one or more association identifiers (AIDS), wherein the AIDS indicate stations that are to respond to the EBRP packet.

In Example 29, the subject matter of Example 28 can optionally include means for receiving feedback from a one or more stations corresponding to the one or more AIDs in a sequential order in accordance with an order of the AIDs.

In Example 30, the subject matter of Example 29 can optionally include means for encoding a final EBRP feedback packet based on the feedback from the one or more stations; and means for causing the final EBRP feedback packet to be transmitted to the one or more stations.

In Example 31, the subject matter of Example 30 can optionally include means for encoding a poll packet to each station of a plurality of stations corresponding to the one or more AIDs; means for causing to be transmitted the poll packet; and means for receiving a feedback from the station in response to the poll packet.

In Example 32, the subject matter of any of Examples 26-31 can optionally include where if only one station is to be trained an antenna weight vector that corresponds to a best transmitted sector for the one station is to be used for each antenna of the plurality of antennas to transmit the first portion of the EBRP packet.

In Example 33, the subject matter of any of Examples 26-32 can optionally include where if multiple stations are to be trained, each antenna of the plurality of antennas is to use a best transmit sector for the antenna to transmit the first portion of the EBRP packet.

In Example 34, the subject matter of any of Examples 26-33 can optionally include means for encoding in the first portion a media access control data portion, wherein the data portion comprises a 3 bit weight vector for each of the first number of transmit antenna training settings for each antenna of the plurality of antennas.

In Example 35, the subject matter of any of Examples 26-34 can optionally include where the access point or station is one from the following group: an Institute of Electrical and Electronic Engineering (IEEE) 802.11ay access point, an IEEE 802.11ay station, IEEE 802.11ay a personal basic service set (PBSS) control point (PCP), an access point, a station, and a PCP.

In Example 36, the subject matter of any of Examples 26-35 can optionally include means for transmitting and receiving in accordance with multiple input multiple output (MIMO), multiple-user MIMO (MU-MIMO) single input single output (SISO), and/or multiple users single input single output (MU-SISO).

In Example 37, the subject matter of any of Examples 26-36 can optionally include means for transmitting and receiving radio waves.

Example 38 is an apparatus of an access point or station, the apparatus comprising: means for decoding a first portion of an enhanced beam refining protocol (EBRP) packet comprising an indication of a first number of transmit antenna training settings (N-TX), and an indication of a second number of receive training subfields per N-TX settings (N-RX); means for decoding a second portion comprising a third number of training subfields, wherein the third number is less than or equal to N-TX times N-RX, wherein two or more of the third number of training subfields are to be received simultaneously using different antenna of a plurality of antennas and orthogonal sequences; and means for analyzing the decoded second portion and encode feedback training subfields.

In Example 39, the subject matter of any of Examples 26-33 can optionally include means for determining if the EBRP packet comprises an association identifier (AID) of the access point or station and if the EBRP packet does not comprise an AID of the access point or station then disregard the EBRP packet.

In Example 40, the subject matter of Examples 38 or 39 can optionally include means for encoding feedback to the EBRP packet and cause the feedback to be transmitted to an initiator wireless device in a sequential order in accordance with an order of the AID in a list of AIDs.

In Example 41, the subject matter of any of Examples 38-40 can optionally include wherein the access point or station is one from the following group: an Institute of Electrical and Electronic Engineering (IEEE) 802.11ay access point, an IEEE 802.11ay station, IEEE 802.11ay a personal basic service set (PBSS) control point (PCP), an access point, a station, and a personal basic service set (PBSS) control point PCP.

In Example 42, the subject matter of any of Examples 38-41 can optionally include means for transmitting and receiving in accordance with multiple input multiple output (MIMO), multiple-user MIMO (MU-MIMO) single input single output (SISO), and/or multiple users single input single output (MU-SISO).

In Example 43, the subject matter of any of Examples 38-42 can optionally include means for transmitting and receiving radio signals.

Example 44 is a non-transitory computer-readable storage medium that stores instructions for execution by one or more processors to perform operations for device-to-device spatial reuse on an access point or station. The operations to configure the access point or station to: decode a first portion of an enhanced beam refining protocol (EBRP) packet comprising an indication of a first number of transmit antenna training settings (N-TX), and an indication of a second number of receive training subfields per N-TX settings (N-RX); decode a second portion comprising a third number of training subfields, wherein the third number is less than or equal to N-TX times N-RX, wherein two or more of the third number of training subfields are to be received simultaneously using different antenna of a plurality of antennas and orthogonal sequences; and analyze the decoded second portion and encode feedback training subfields.

In Example 45, the subject matter of Example 44 can optionally include where the instructions further configure the access point or station to: determine if the EBRP packet comprises an association identifier (AID) of the access point or station and if the EBRP packet does not comprise an AID of the access point or station then disregard the EBRP packet.

In Example 46, the subject matter of Examples 44 or 45 can optionally include where the instructions further configure the access point or station to: encode feedback to the EBRP packet and cause the feedback to be transmitted to an initiator wireless device in a sequential order in accordance with an order of the AID in a list of AIDs.

In Example 47, the subject matter of any of Examples 44-46 can optionally include where the access point or station is one from the following group: an Institute of Electrical and Electronic Engineering (IEEE) 802.11ay access point, an IEEE 802.11ay station, IEEE 802.11ay a personal basic service set (PBSS) control point (PCP), an access point, a station, and a personal basic service set (PBSS) control point PCP.

In Example 48, the subject matter of any of Examples 44-47 can optionally include where the instructions further configure the access point or station to: transmit and receive in accordance with multiple input multiple output (MIMO), multiple-user MIMO (MU-MIMO) single input single output (SISO), and/or multiple users single input single output (MU-SISO).

Example 49 is a method performed an access point or station. The method comprising: decoding a first portion of an enhanced beam refining protocol (EBRP) packet comprising an indication of a first number of transmit antenna training settings (N-TX), and an indication of a second number of receive training subfields per N-TX settings (N-RX); decoding a second portion comprising a third number of training subfields, wherein the third number is less than or equal to N-TX times N-RX, wherein two or more of the third number of training subfields are to be received simultaneously using different antenna of a plurality of antennas and orthogonal sequences; and analyzing the decoded second portion and encode feedback training subfields.

In Example 50, the subject matter of Example 49 can optionally include determine if the EBRP packet comprises an association identifier (AID) of the access point or station and if the EBRP packet does not comprise an AID of the access point or station then disregard the EBRP packet.

In Example 51, the subject matter of Examples 49 or 50 can optionally include encoding feedback to the EBRP packet and cause the feedback to be transmitted to an initiator wireless device in a sequential order in accordance with an order of the AID in a list of AIDs.

In Example 52, the subject matter of any of Examples 49-51 can optionally include where the access point or station is one from the following group: an Institute of Electrical and Electronic Engineering (IEEE) 802.11ay access point, an IEEE 802.11ay station, IEEE 802.11ay a personal basic service set (PBSS) control point (PCP), an access point, a station, and a personal basic service set (PBSS) control point PCP.

In Example 53, the subject matter of any of Examples 49-52 can optionally include transmitting and receiving in accordance with multiple input multiple output (MIMO), multiple-user MIMO (MU-MIMO) single input single output (SISO), and/or multiple users single input single output (MU-SISO).

The Abstract is provided to comply with 37 C.F.R Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an station, the apparatus comprising: memory; and processing circuitry coupled to the memory, the processing circuitry configured to:
    encode an enhanced beam refining protocol (EBRP) packet comprising a first portion comprising an indication of a first number of transmit antenna training settings (N-TX), and an indication of a second number of receive training subfields per N-TX settings (N-RX), and a second portion comprising a third number of training subfields, wherein the third number is less than or equal to N-TX times N-RX;
    configure the station to transmit the first portion of the EBRP packet; and
    configure the station to transmit the second portion comprising the third number of training subfields, wherein two or more of the training subfields of the third number of training subfields are to be transmitted simultaneously using different antennas of a plurality of antennas and orthogonal sequences.

2. The apparatus of claim 1, wherein the EBRP packet further comprises a legacy header which indicates a packet length of the first portion and the second portion, and wherein the second portion further comprises automatic gain control (AGC).

3. The apparatus of claim 1, wherein the processing circuitry is further configured to:
    encode the EBRP packet with one or more association identifiers (AIDS), wherein the AIDS indicate stations that are to respond to the EBRP packet.

4. The apparatus of claim 3, wherein the processing circuitry is further configured to:
    receive feedback from one or more stations corresponding to the one or more AIDs in a sequential order in accordance with an order of the AIDs.

5. The apparatus of claim 4, wherein the processing circuitry is further configured to:
    encode a final EBRP feedback packet based on the feedback from the one or more stations; and
    cause the final EBRP feedback packet to be transmitted to the one or more stations.

6. The apparatus of claim 3, wherein the processing circuitry is further configured to:
    encode a poll packet to each station of a plurality of stations corresponding to the one or more AIDs;
    cause to be transmitted the poll packet; and
    receive a feedback from the station in response to the poll packet.

7. The apparatus of claim 1, wherein if only one station is to be trained an antenna weight vector that corresponds to a best transmitted sector for the one station is to be used for each antenna of the plurality of antennas to transmit the first portion of the EBRP packet.

8. The apparatus of claim 1, wherein if multiple stations are to be trained, each antenna of the plurality of antennas is to use a best transmit sector for the antenna to transmit the first portion of the EBRP packet.

9. The apparatus of claim 1, wherein the processing circuitry is further configure to:
encode in the first portion a media access control data portion, wherein the data portion comprises a 3 bit weight vector for each of the first number of transmit antenna training settings for each antenna of the plurality of antennas.

10. The apparatus of claim 1, wherein the station is one from the following group:
an Institute of Electrical and Electronic Engineering (IEEE) 802.11ay access point, an IEEE 802.11ay station, IEEE 802.11ay a personal basic service set (PBSS) control point (PCP), an access point, a station, and a PCP.

11. The apparatus of claim 1, wherein the processing circuitry is configured to transmit and receive in accordance with multiple input multiple output (MIMO), multiple-user MIMO (MU-MIMO) single input single output (SISO), and/or multiple users single input single output (MU-SISO).

12. The apparatus of claim 1, further comprising: transceiver circuitry; and, a plurality of antennas coupled to the transceiver circuitry.

13. A non-transitory computer-readable storage medium that stores instructions for execution by one or more processors to perform operations for device-to-device spatial reuse on a station, the operations to configure the station to:
encode an enhanced beam refining protocol (EBRP) packet comprising a first portion comprising an indication of a first number of transmit antenna training settings (N-TX), and an indication of a second number of receive training subfields per N-TX settings (N-RX), and a second portion comprising a third number of training subfields, wherein the third number is less than or equal to N-TX times N-RX;
configure the station to transmit the first portion of the EBRP packet; and
configure the station to transmit the second portion comprising the third number of training subfields, wherein two or more of the training subfields of the third number of training subfields are to be transmitted simultaneously using different antennas of a plurality of antennas and orthogonal sequences.

14. The non-transitory computer-readable storage medium of claim 13, wherein the instructions further configure the station to:
encode the BRP packet with one or more association identifiers (AIDS), wherein the AIDS indicate stations that are to respond to the EBRP packet.

15. The non-transitory computer-readable storage medium of claim 13, wherein the instructions further configure the station to:
receive feedback from a one or more stations corresponding to the one or more AIDs in a sequential order in accordance with an order of the AIDs.

16. The non-transitory computer-readable storage medium of claim 15, wherein the instructions further configure the station to:
encode a final EBRP feedback packet based on the feedback from the one or more stations; and
cause the final EBRP feedback packet to be transmitted to the one or more stations.

17. The non-transitory computer-readable storage medium of claim 15, wherein the instructions further configure the station to:

encode a poll packet to each station of a plurality of stations corresponding to the one or more AIDs;
cause to be transmitted the poll packet; and
receive a feedback from the station in response to the poll packet.

18. A method performed by an station, the method comprising:
encoding an enhanced beam refining protocol (EBRP) packet comprising a first portion comprising an indication of a first number of transmit antenna training settings (N-TX), and an indication of a second number of receive training subfields per N-TX settings (N-RX), and a second portion comprising a third number of training subfields, wherein the third number is less than or equal to N-TX times N-RX;
transmitting the first portion of the EBRP packet; and
transmitting the second portion comprising the third number of training subfields to be transmitted, wherein two or more of the training subfields of the third number of training subfields are to be transmitted simultaneously using different antennas of a plurality of antennas and orthogonal sequences.

19. The method of claim 18, further comprising:
encoding the BRP packet with one or more association identifiers (AIDS), wherein the AIDS indicate stations that are to respond to the EBRP packet.

20. An apparatus of an station, the apparatus comprising memory and processing circuitry coupled to the memory, the processing circuitry configured to:
decode a first portion of an enhanced beam refining protocol (EBRP) packet comprising an indication of a first number of transmit antenna training settings (N-TX), and an indication of a second number of receive training subfields per N-TX settings (N-RX);
decode a second portion comprising a third number of training subfields, wherein the third number is less than or equal to N-TX times N-RX, wherein two or more of the training subfields of the third number of training subfields are to be received simultaneously using different antenna of a plurality of antennas and orthogonal sequences; and
analyze the decoded second portion and encode feedback training subfields.

21. The apparatus of claim 20, wherein the processing circuitry is further configured to:
determine if the EBRP packet comprises an association identifier (AID) of the station and if the EBRP packet does not comprise an AID of the station then disregard the EBRP packet.

22. The apparatus of claim 21, wherein the processing circuitry is further configured to:
encode feedback to the EBRP packet and cause the feedback to be transmitted to an initiator wireless device in a sequential order in accordance with an order of the AID in a list of AIDs.

23. The apparatus of claim 20, wherein the station is one from the following group:
an Institute of Electrical and Electronic Engineering (IEEE) 802.11ay access point, an IEEE 802.11ay station, IEEE 802.11ay a personal basic service set (PBSS) control point (PCP), an access point, a station, and a personal basic service set (PBSS) control point PCP.

24. The apparatus of claim 20, wherein the processing circuitry is configured to transmit and receive in accordance with multiple input multiple output (MIMO), multiple-user MIMO (MU-MIMO) single input single output (SISO), and/or multiple users single input single output (MU-SISO).

25. The apparatus of claim 20, further comprising a plurality of antennas coupled to the processing circuitry.

\* \* \* \* \*